July 23, 1957 — H. F. ANDERSON — 2,800,377
PISTON RING ASSEMBLY AND ELEMENTS THEREOF
Filed March 21, 1956
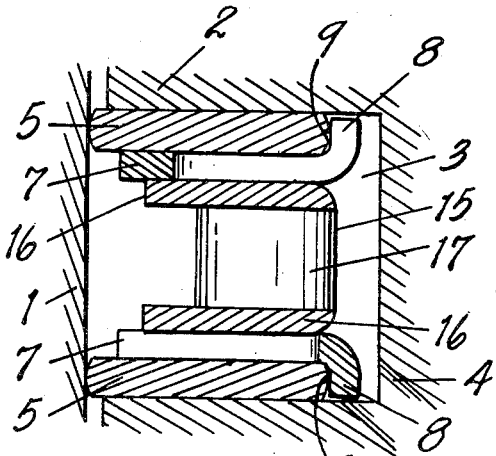
Fig. 1.
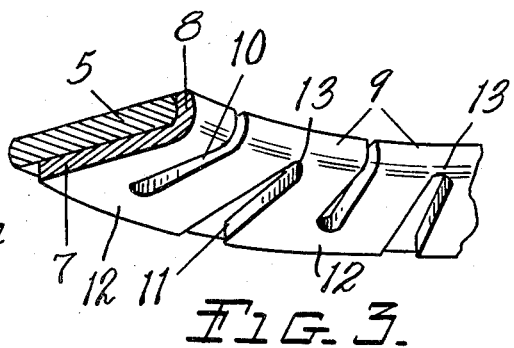
Fig. 3.
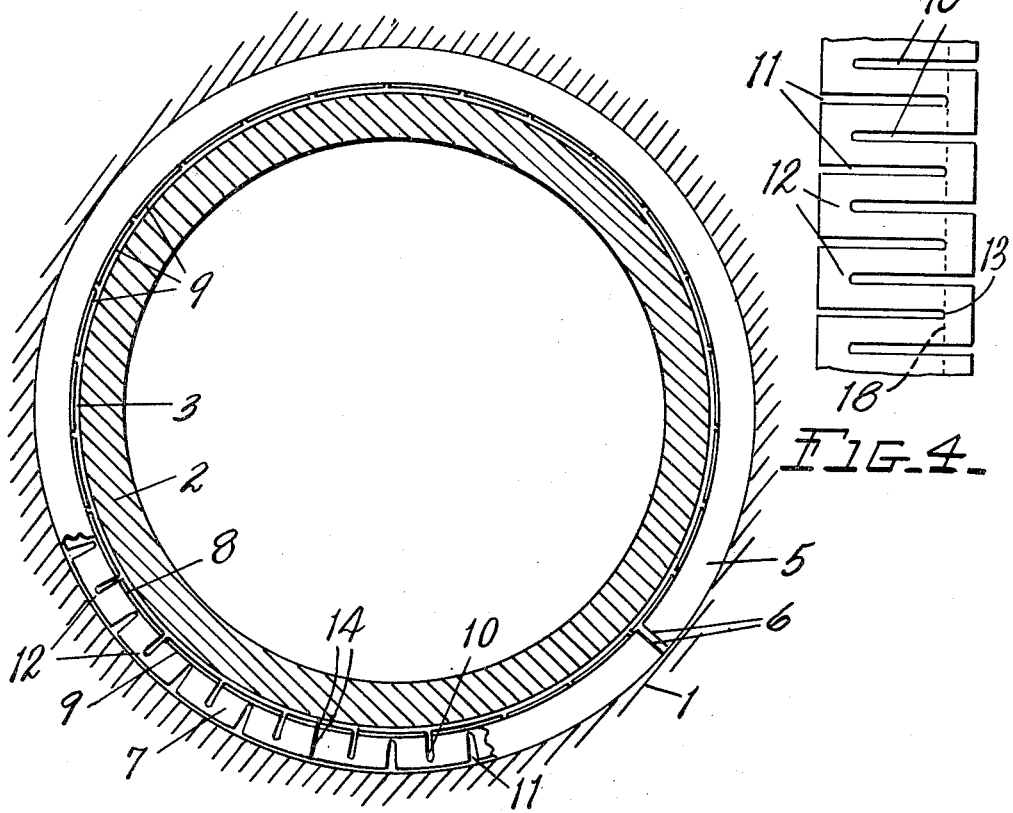
Fig. 2.
Fig. 4.
INVENTOR.
Hugo F. Anderson
BY
Otto A. Earl
Attorney.

United States Patent Office 2,800,377
Patented July 23, 1957

2,800,377
PISTON RING ASSEMBLY AND ELEMENTS THEREOF

Hugo F. Anderson, Hastings, Mich., assignor to Hastings Manufacturing Company, Hastings, Mich.

Application March 21, 1956, Serial No. 573,002

6 Claims. (Cl. 309—44)

This invention relates to a piston ring assembly and elements thereof.

The main objects of this invention are:

First, to provide a piston ring assembly which is adapted for installation in piston ring grooves of varying depths and one in which the cylinder wall engaging elements are subjected to substantially uniform springable radial thrust throughout the circumference thereof.

Second, to provide a piston ring assembly in which the parts are formed of ductile metal stock and which may be readily installed with little likelihood of injuring the parts by distortion during installation.

Objects relating to details and economies of the invention will appear from the description to follow. The invention is defined and pointed out in the claims.

A preferred embodiment of the invention is illustrated in the accompanying drawing, in which:

Fig. 1 is a fragmentary longitudinal section of a cylinder and associated piston with the ring assembly of my invention installed therein, the piston and cylinder being conventionally shown, the parts being illustrated without regard to relative dimensions, tolerances and clearances.

Fig. 2 is a fragmentary view in transverse section illustrating the relation of the piston ring assembly to a piston and cylinder wall, parts being broken away to show structural details.

Fig. 3 is an enlarged perspective view of one of the assembly units comprising a rail and associated expander member.

Fig. 4 is a fragmentary plan view of a partially formed expander member.

This application is a division of my application for Letters Patent filed August 11, 1953, Serial No. 373,565, Patent No. 2,776,865, issued January 8, 1957.

In the accompanying drawing 1 represents a cylinder, 2 a piston having a piston ring groove 3 therein. The groove illustrated is adapted to receive an oil ring assembly and is provided with drain openings 4.

It will be understood that the parts are shown greatly enlarged as compared to commercial structures and without regard to clearances and tolerances. Dimensions, clearances and tolerances are usually determined by the specifications for a particular engine or piston.

The piston ring assembly of my invention comprises cylinder wall engaging elements or rails 5 disposed in axially spaced relation and in supported relation to the side walls of the piston ring groove. These rails 5 are desirably formed of ribbon steel coiled edgewise and are split at 6 and are radially expansible. Each cylinder wall engaging element or rail is provided with an individual expander 7 also formed of ribbon steel coiled edgewise and each having an outwardly and axially disposed flange 8 at the inner edge thereof consisting of a plurality of segments or radial thrust abutment elements 9 for the rail 5 when the expander is disposed in side by side relation thereto as is illustrated in the drawing.

The expander members have a plurality of angularly spaced slots 10 opening at their inner edges and a plurality of radial slots 11 opening at their outer edges and the slots 10 and 11 are alternately uniformly spaced relative to each other. These slots provide an annular series of springably connected elements 12 each having a rail engaging abutment element 9. The ends of the abutment elements are in noncontacting but closely spaced relation being separated only by the slots which open at the inner edges of the expander members and each abutment element is in supporting engagement with the associated rail, the rail being disposed between the expander members and the adjacent wall of the groove.

When installed the ends 14 of the expanders are in abutting relation as indicated in Fig. 2 with the expander members under circumferentially springable stress so that the cylinder wall engaging member mounted thereon is springably urged radially outward.

In the preferred embodiment the inner ends 13 of the slots which open to the outer periphery of the expanders terminate closely adjacent the abutment elements. This adds to circumferential flexibility of the expander members and to the independent springable action of the springable elements constituting the expander members.

In the embodiment illustrated the expander members are supported for independent radial springable action by the spacer designated generally by the numeral 15. This spacer is of generally outwardly facing channel section and comprises side members or flanges 16 with portions 17 of the web struck outward and conformed to support the flanges or side portions of the spacer. This permits the spacer being formed of very light stock. Other forms of spacers may be used, for example, such as used in the Phillips Patent No. 2,466,478.

The abutment elements provide a substantially continuous support for the rails but they are independent in action to a substantial degree so that the rails are subjected to substantial uniformly radial thrust and readily conform to out of round cylinders and to the taper of worn cylinders. While, as stated, I have not attempted to illustrate the parts in relative dimensions or to illustrate clearances or tolerances, the cylinder wall engaging elements or rail may desirably be formed of stock of the order of .015 to .030 thickness and the expander members may be formed of stock of the same thickness although satisfactory results may be had with stock of the order of .015 to .024. As previously stated, the cylinder elements or the spacer elements are desirably formed of ductile metal.

In Fig. 4 I illustrate certain preliminary steps in the forming of the expander members and particularly the relation of the slots. The dotted line 18 indicates a desirable bending point to form the abutment elements.

I have illustrated and described my invention in a highly practical embodiment. I have not attempted to illustrate or describe other embodiments or adaptations as it is believed this disclosure will enable those skilled in the art to embody or adapt my invention as may be desired.

Having thus described my invention what I claim as new and desire to secure by Letters Patent is:

1. A piston ring assembly comprising axially spaced annular split expansible cylinder wall engaging rails, annular split expander members formed of ductile ribbon metal coiled edgewise and disposed at the inner sides of the rails in side by side relation thereto and having flanges on their inner edges disposed axially outward and constituting radial thrust abutments for the rails, said expander members having a plurality of angularly spaced radially disposed slots opening alternately at their inner and outer edges providing an annular series of springable elements each having an abutment element, the ends of the expander members being in abutting relation with the expander members under spring stress when the assembly is installed in a piston ring groove with the rails in coacting relation to the sides of the groove and springably urged radially outward, and a spacer disposed between the expander members in axial thrust supporting relation thereto, the expander members being free for independent radial spring action independently of each other and of the spacer.

2. A piston ring assembly comprising axially spaced annular split expansible cylinder wall engaging rails, annular split expander members disposed at the inner sides of the rails in side by side relation thereto and having radial thrust abutments for the rails, said expander members having angularly spaced radially disposed slots opening alternately at their inner and outer edges providing an annular series of springable elements each having an abutment element, the ends of the expander members being in abutting relation with the expander members under spring stress when the assembly is installed in a piston ring groove with the rails in coacting relation to the sides of the groove and springably urged radially outward, and a spacer disposed between the expander members and having side portions of a radial width approximating that of the expander members and in side by side axial thrust supporting relation thereto, the expander members being free for independent radial spring action independently of the spacer.

3. A piston ring assembly comprising axially spaced annular split expansible cylinder wall engaging rails, annular split expander members formed of ductile ribbon metal coiled edgewise and having flanges on their inner edges disposed axially outward, said expander members having a plurality of angularly spaced radially disposed slots opening alternately at their inner and outer edges providing an annular series of circumferentially springable elements, said expander members being disposed on the inner sides of the rails in side by side relation thereto and with their flanges in engagement with the inner edges of the rails, the expander members being under spring stress with their ends in abutting engagement when the assembly is installed in a piston ring groove, and a spacer disposed between the expander members in axial thrust supporting relation thrteo, the expander members being free for independent radially springable action independently of each other and of the spacer.

4. A piston ring assembly comprising axially spaced annular split expansible cylinder wall engaging rails, annular split expander members having radial thrust abutments for the rails, said expander members having a plurality of angularly spaced radially disposed slots opening alternately at their inner and outer edges providing an annular series of circumferentially springable elements, said expander members being disposed with their abutments in engagement with the inner edges of the rails, the expander members being under spring stress with their ends in abutting engagement when the assembly is installed in a piston ring groove, and a spacer disposed between the expander members in axial thrust supporting relation thereto, the expander members being free for independent radially springable action independently of each other and of the spacer.

5. A piston ring assembly comprising an annular split expansible cylinder wall engaging rail, an annular split expander member formed of ductile ribbon metal coiled edgewise and disposed at the inner side of the rail in side by side relation thereto and having an axially disposed flange on its inner edge disposed axially within the rail, said expander member having a plurality of angularly and uniformly spaced radially disposed slots opening alternately at its inner and outer edges providing an annular series of circumferentially springable elements, each having a rail engaging abutment element, the ends of the expander member being in abutting relation with the several springable elements thereof under springable stress when the assembly is installed in a piston ring groove with the rail in coacting relation to a side wall of the groove, the inner ends of the slots which open to the outer edge of the expander terminating closely adjacent the abutment elements, the ends of the abutment elements being spaced the width of the slots.

6. A piston ring assembly comprising an annular split expansible cylinder wall engaging rail, and an annular split expander member formed of ductile ribbon metal coiled edgewise and disposed at the inner side of the rail in side by side relation thereto and having an axially disposed flange on its inner edge disposed axially within the rail, said expander member having a plurality of angularly and uniformly spaced radially disposed slots opening alternately at its inner and outer edges providing an annular series of circumferentially springable elements, each having a rail engaging abutment element, the ends of the abutments being spaced the width of the slots opening at the inner edge of the expander member, the ends of the expander member being in abutting relation with the several springable elements thereof under springable stress when the assembly is installed in a piston ring groove with the rail in coacting relation to a side wall of the groove, the inner ends of the slots which open to the outer edge of the expander terminating closely adjacent the abutment elements.

References Cited in the file of this patent

UNITED STATES PATENTS

| | | |
|---|---|---|
| 2,596,286 | Phillips | May 13, 1952 |
| 2,670,256 | Hsia-Si Pien | Feb. 23, 1954 |
| 2,712,971 | Phillips | July 12, 1955 |
| 2,776,865 | Anderson | Jan. 8, 1957 |